United States Patent
Dorrell

(10) Patent No.: US 10,405,011 B2
(45) Date of Patent: Sep. 3, 2019

(54) METHOD, SYSTEM, APPARATUS AND READABLE MEDIUM FOR GENERATING TWO VIDEO STREAMS FROM A RECEIVED VIDEO STREAM

(71) Applicant: CANON KABUSHIKI KAISHA, Tokyo (JP)

(72) Inventor: Andrew James Dorrell, Glenbrook (AU)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 15/650,411

(22) Filed: Jul. 14, 2017

(65) Prior Publication Data

US 2019/0020904 A1    Jan. 17, 2019

(51) Int. Cl.
| | |
|---|---|
| *H04N 21/2187* | (2011.01) |
| *G08B 13/196* | (2006.01) |
| *H04N 21/234* | (2011.01) |
| *H04N 21/242* | (2011.01) |
| *H04L 29/06* | (2006.01) |
| *H04L 12/26* | (2006.01) |
| *H04N 21/239* | (2011.01) |

(52) U.S. Cl.
CPC ... *H04N 21/2187* (2013.01); *G08B 13/19645* (2013.01); *G08B 13/19665* (2013.01); *G08B 13/19678* (2013.01); *H04L 43/08* (2013.01); *H04L 65/607* (2013.01); *H04N 21/234* (2013.01); *H04N 21/2396* (2013.01); *H04N 21/242* (2013.01)

(58) Field of Classification Search
CPC ....... H04N 19/189–23; H04N 21/2187; H04N 21/234; H04N 21/2396; H04N 21/242; G08B 13/19645; G08B 13/19665; G08B 13/19678; H04L 65/607; H04L 43/08
USPC .................................................. 375/240.16
See application file for complete search history.

(56) References Cited

U.S. PATENT DOCUMENTS

| | | | |
|---|---|---|---|
| 6,509,926 B1 | 1/2003 | Mills et al. | |
| 9,058,523 B2 | 6/2015 | Merkel et al. | |
| 9,172,919 B2 | 10/2015 | Berlic et al. | |
| 9,210,312 B2 | 12/2015 | Sablak et al. | |
| 9,237,266 B2* | 1/2016 | Tojo | G06K 9/00771 |
| 9,241,147 B2 | 1/2016 | Dejohn et al. | |
| 9,621,917 B2* | 4/2017 | Kottke | H04N 19/56 |
| 9,743,078 B2* | 8/2017 | DeForest | H04N 19/51 |
| 2001/0033330 A1* | 10/2001 | Garoutte | G06K 9/00771 |
| | | | 348/153 |
| 2004/0246336 A1* | 12/2004 | Kelly, III | G06K 9/00771 |
| | | | 348/143 |

(Continued)

*Primary Examiner* — Tung T Vo
(74) *Attorney, Agent, or Firm* — Canon U.S.A., Inc. I.P. Division

(57) ABSTRACT

At least one method, apparatus, system and readable medium for generating two video streams from a received video stream are provided herein. A scene captured by the received video stream is divided into a first region and a second region by placing a virtual plane in the scene. The regions of the scene represented in the received video stream are assigned to at least one of two output video streams, the first region being assigned to at least a first output video stream and the second region to at least a second output video stream according to the virtual plane. Pixel data assigned to each output video stream is encoded to generate the two video streams.

20 Claims, 11 Drawing Sheets

(56) References Cited

U.S. PATENT DOCUMENTS

2012/0086780 A1* 4/2012 Sharma .............. G06K 9/00771
348/46

* cited by examiner

METHOD, SYSTEM, APPARATUS AND READABLE MEDIUM FOR GENERATING TWO VIDEO STREAMS FROM A RECEIVED VIDEO STREAM

TECHNICAL FIELD

The present disclosure relates generally to the field of network video cameras and, in particular to fixed camera installations such as are typically used for surveillance purposes.

BACKGROUND

FIGS. 1A and 1B show two points of view 100, 101, respectively, of an example urban setting comprising the boundary 120 between two properties. In FIG. 1A, there are two areas either side of a dividing line 193, indicated by vectors 191 and 192, which are visible within the field of view of a surveillance camera 190 shown in FIG. 1B. The area indicated by 191 hosts the surveillance camera 190 and occupant 110, who is typically a primary stakeholder in the camera 190, and derives a direct benefit from the presence of the camera 190. The second area, indicated by 192, is a private space vested with an occupant 112 who perceives the neighbouring surveillance camera 190 as an incursion of privacy. As such, the occupant 112 of the second area objects to the installation of the camera 190, creating a bad relationship with the occupant 110 of the first area, possibly leading to the camera 190 being removed or positioned in a sub-optimal location.

The surveillance camera 190 may be equipped with the ability to screen out certain areas of an acquired image. In order to screen out the certain areas of an acquired image, an example screen 121 is overlayed in both points of view 100 and 101. However, objects within a volume indicated by 191, occupied by the camera owner (e.g., 110), may be inadvertently screened out as indicated by the region 111 in FIG. 1B.

Moving features may be masked from an output of the camera 190 if the features are considered to be behind a virtual plane in an image. While such masking works in a technical sense, the implementation of the masking is only evident to the camera owner (e.g., 110) and therefore may not be associated with an increased perception of privacy on the part of the affected party 112. In addition, screening out certain areas or masking, as described above, only considers screens which are substantially parallel to the image plane which limits their utility.

SUMMARY

It is an object of at least one embodiment of the present disclosure to substantially overcome, or at least ameliorate, one or more issues of existing arrangements.

Disclosed are arrangements which seek to provide a privacy preserving solution as well as a value proposition for the affected occupant 112 thus overcoming the risk of disaffection. The disclosed arrangements operate to generate two separate video streams, from an internal video stream of a camera, which are accessed using independent credentials. Segmentation of the video streams is performed based on measured depth information.

According to at least one aspect of the present disclosure, there is provided at least one embodiment of a method of generating two video streams from a received video stream, the method comprising: dividing a scene captured by the received video stream into a first region and a second region by placing a virtual plane in the scene; assigning the regions of the scene represented in the received video stream to at least one of two output video streams, the first region being assigned to at least a first output video stream and the second region to at least a second output video stream according to the virtual plane; and encoding pixel data assigned to each output video stream to generate the two video streams.

According to another aspect of the present disclosure, there is provided at least one apparatus for generating two video streams from a received video stream, the apparatus comprising: means for dividing a scene captured by the received video stream into a first region and a second region by placing a virtual plane in the scene; means for assigning the regions of the scene represented in the received video stream to at least one of two output video streams, the first region being assigned to at least a first output video stream and the second region to at least a second output video stream according to the virtual plane; and means for encoding pixel data assigned to each output video stream to generate the two video streams.

According to still another aspect of the present disclosure, there is provided at least one system for generating two video streams from a received video stream, the system comprising: a memory for storing data and a computer program; a processor coupled to the memory for executing the program, the processor operating to: divide a scene captured by the received video stream into a first region and a second region by placing a virtual plane in the scene; assign the regions of the scene represented in the received video stream to at least one of two output video streams, the first region being assigned to at least a first output video stream and the second region to at least a second output video stream according to the virtual plane; and encode pixel data assigned to each output video stream to generate the two video streams.

According to still another aspect of the present disclosure, there is provided a non-transitory computer readable medium storing at least one computer program that causes a processor to execute a method for generating two video streams from a received video stream, the method comprising: dividing a scene captured by the received video stream into a first region and a second region by placing a virtual plane in the scene; assigning the regions of the scene represented in the received video stream to at least one of two output video streams, the first region being assigned to at least a first output video stream and the second region to at least a second output video stream according to the virtual plane; and encoding pixel data assigned to each output video stream to generate the two video streams.

Other aspects are also disclosed.

BRIEF DESCRIPTION OF THE DRAWINGS

One or more aspects of at least one embodiment of the present invention will now be described with reference to the following drawings, in which.

DETAILED DESCRIPTION INCLUDING BEST MODE

Figure 1A:
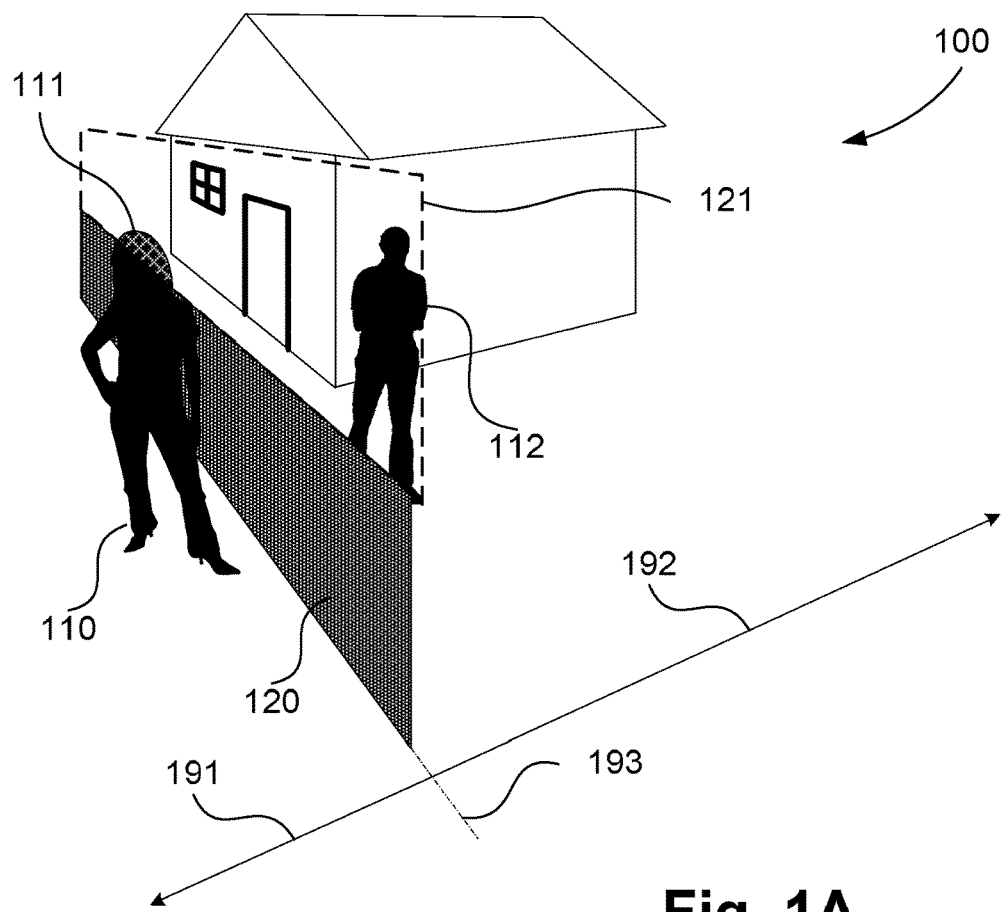
FIG. 1A shows a point of view of an example urban setting.

Where reference is made in any one or more of the accompanying drawings to steps and/or features, which have the same reference numerals, those steps and/or features have for the purposes of this description the same function(s) or operation(s), unless the contrary intention appears.

Figure 1B:
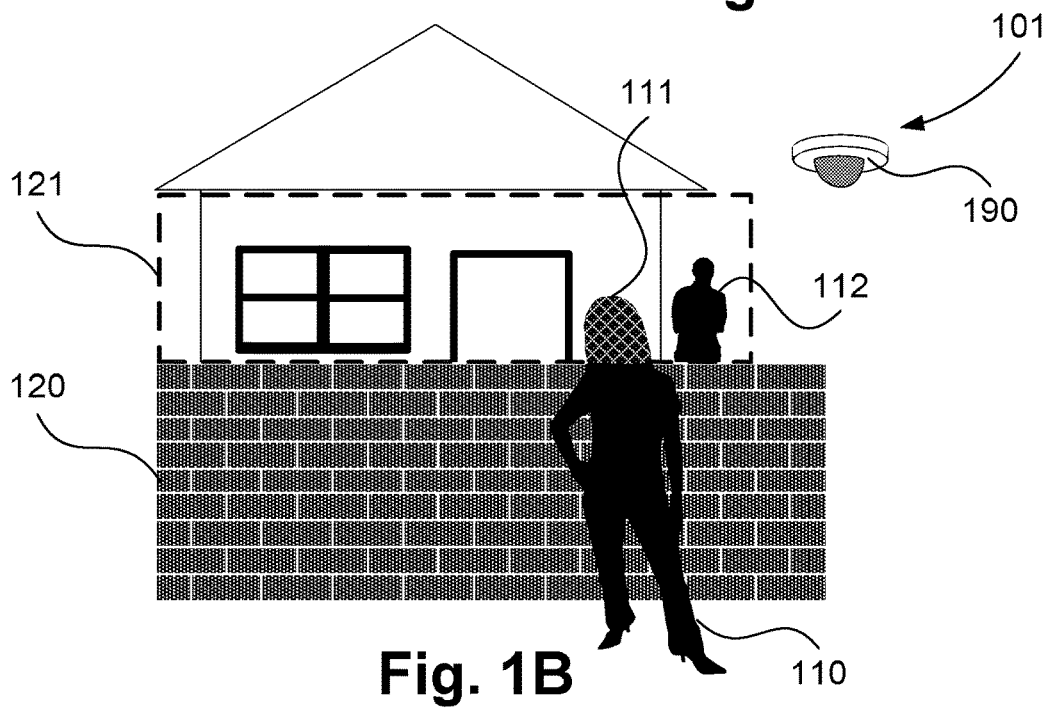
FIG. 1B shows another point of view of the example urban setting of FIG. 1A.

A camera system 300 and related methods are described below with reference to FIG. 3. The described system 300 and methods seek to provide privacy as well as a value proposition for an affected occupant such as the occupant 112 in the example of FIGS. 1A and 1B.

Figure 2A:
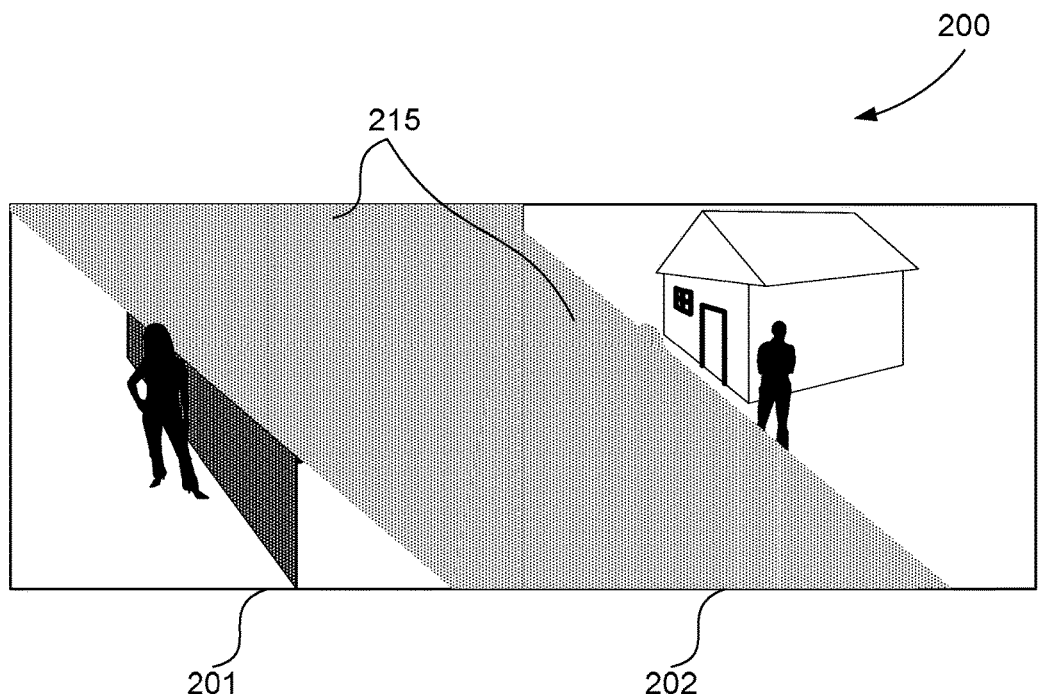
FIG. 2A shows two views of a scene corresponding to the camera view shown in FIG. 1A.
Figure 2B:
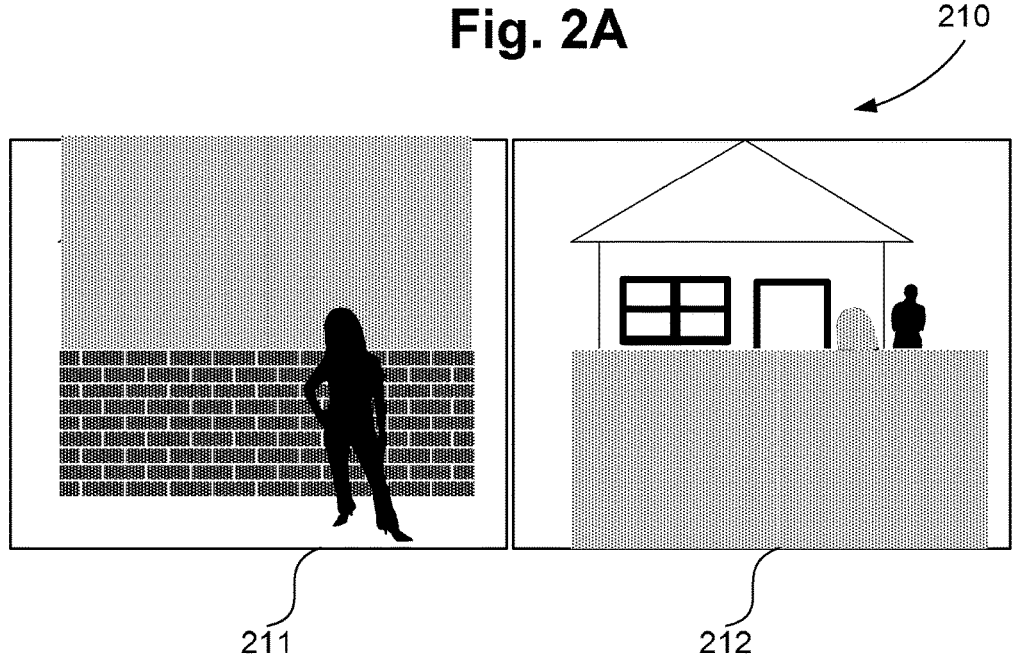
FIG. 2B shows two views of a scene corresponding to the camera view shown in FIG. 1B.

The system 300 operates to generate, from an internal video stream of a camera, two separate video streams which are accessed using independent credentials. FIG. 2A shows two views 201 and 202 of a scene corresponding to the camera view shown in FIG. 1A. FIG. 2B shows two views 211 and 212 corresponding to the camera view shown in FIG. 1B. Each of the views (e.g., 211) is represented by a video stream.

Each of the two video streams (e.g., 211, 212) show areas of the scene that are determined to be positioned on one of two sides of a virtual three dimensional (3D) partition or plane. The projection 215 of the 3D partition onto the image appears similar to the two dimensional (2D) partition 121. As seen in FIG. 2A, the projected 3D partition 215 is shown as a 2D shape. However, the 3D partition differs in that the 3D partition encodes screen depth for each image pixel location within a screened area.

After mutually agreed positioning of the virtual 3D partition (virtual plane), each occupant (e.g., 110 and 112) is able to access a video stream that shows objects residing only in the area on their side of the virtual 3D partition. Access to the video stream provides both a surveillance asset and an assurance of privacy to each occupant by documenting information which has been removed from the video feed of another party.

Figure 10A:
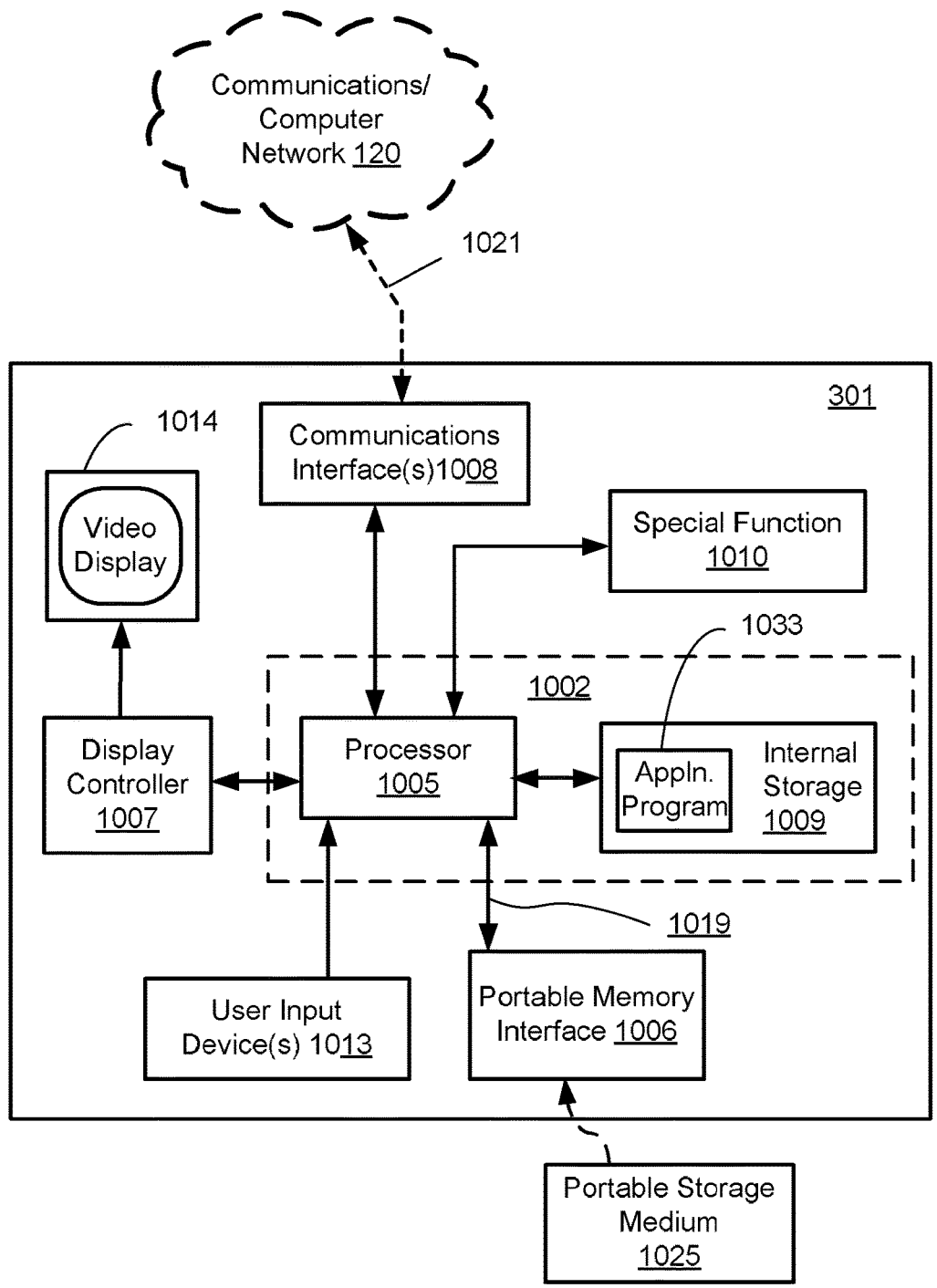
FIGS. 10A and 10B collectively form a schematic block diagram representation of a camera device upon which described arrangements can be practised.

In order to implement a 3D partition for a video stream, the system 300 comprises a video data sourcing component in the form of a camera device 301 (see FIG. 10A). The camera device 301 may be positioned in an area such as the area 191 of FIG. 1A, similar to the surveillance camera 190, and may be used for security and other surveillance purposes. The system 300 may also comprise a processing system.

The video data sourcing component in the form of the camera device 301 is configured for determining, in real-time, a position of any new object within a field of view relative to a virtual 3D partition. In order to achieve negotiation and placement of a 3D partition, the system 300 comprises a service component 303. The service component 303 is used for the purpose of contract negotiation between parties 110 and 112. Through specific communication 331, 330, the service component 303 provides the registration and communication methods used to establish a usage agreement between the parties affected by operation of the camera device 301. The partition details in the communication 330, 331, 306 include but are not limited to a partition location, the party requesting for a partition, update of a previous partition request, etc. The service component 303 further provides a tool for creating and positioning a virtual 3D partition in the image space.

The service component 303 also provides a means for implementing the agreed contract. The contract is implemented by a video stream controller component 302 which, through specific communication 306, 305 with the service component 303 and video data sourcing component (i.e., in the form of the camera device 301), respectively, is provided with partition and authentication data for a set of registered parties 112,110. The contract is enforced by implementing a splitting of the native video stream of the camera and subsequently preventing access to the original (un-split) video data. Further, each of the (split) video streams generated is accessed using separate login credentials such that each party may, through specific communication (321, 320) achieve exclusive access to one of the newly generated (split) video streams.

The service component 303 permits a version of the full video stream to be recovered by combining the split video streams where the split is authorised by both parties 110, 112. Permitting a version of the full video stream to be recovered may be important for example if seeking to reconstruct an event that occurred across the two areas being surveyed. The system 300 is configured to determine that there is sufficient information in the two split streams that a full frame recovery is possible without impacting on the visual or semantic fidelity. The described system 300 addresses the privacy concerns of a second party 112 affected by the installation of a surveillance camera by a first party 110 where the camera of the camera device 301 takes in a field of view occupied otherwise independently and with privacy by the two parties. The system 300 addresses the privacy concerns without loss of function and with the addition of features that provide a benefit to the second party 112, thus providing an incentive for the acceptance of the camera installation by the second party.

Figure 3:
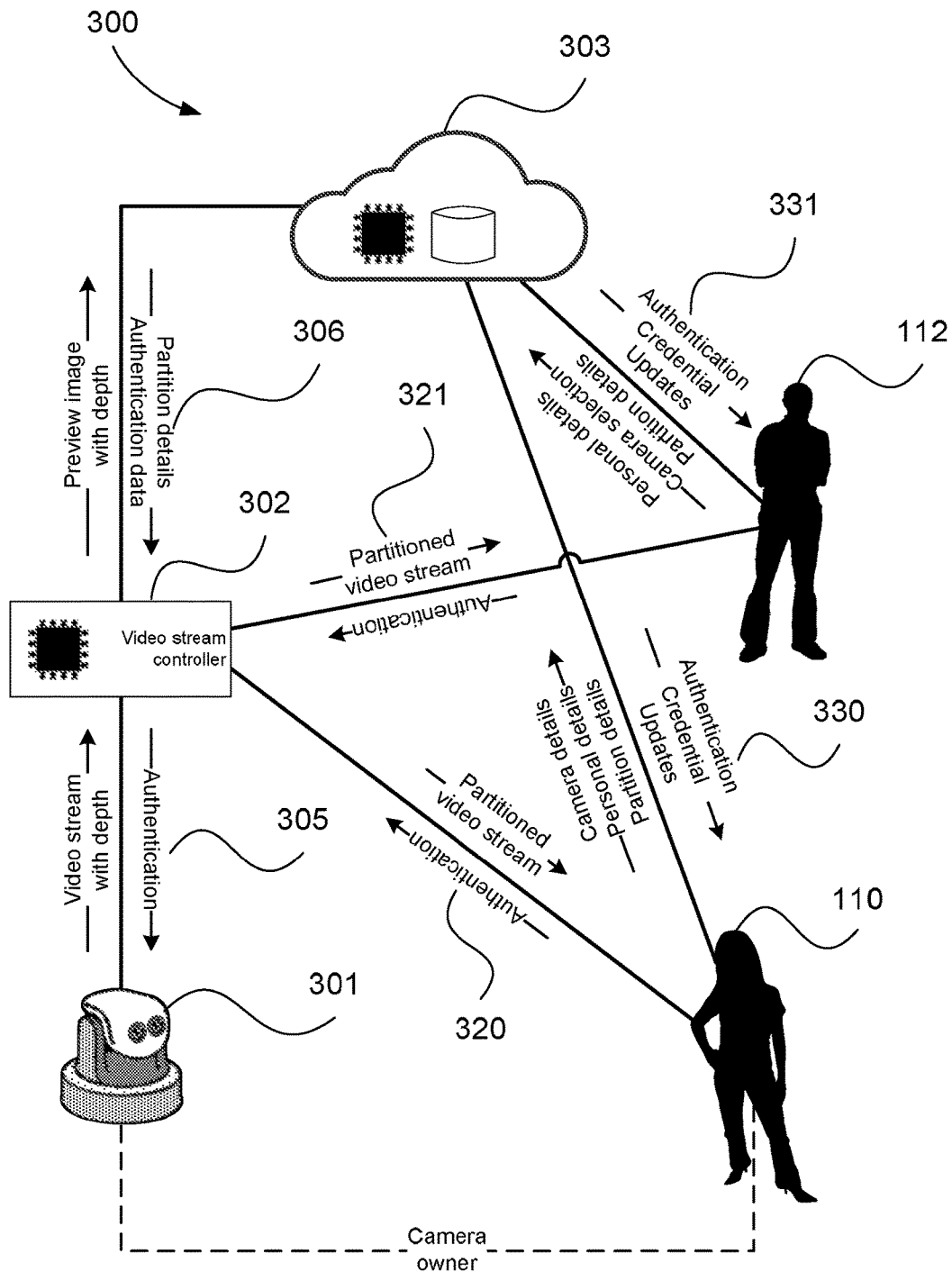
FIG. 3 shows a camera system upon which described arrangements can be practised.

The system 300 is implemented using three logical components as shown in FIG. 3. The video data sourcing component, in the form of the camera device 301, incorporates a camera and processing components required to generate RGB image frames at a required video rate, along with depth information. A video stream controller component 302 provides segmentation and coding of the video frame data. A first party 110, who is also a camera owner, may connect 320 to the video stream controller component 302 via a network, using security credentials. Similarly, a second party 112 who is not a camera owner but is affected by the camera installation, may connect 321 to the video stream controller component 302, via a network, using security credentials. In both cases, the video stream controller component 302 is responsible for validating the credentials, determining a segmentation specification for the connected user, segmenting the video frame data from the video data sourcing component, in the form of the camera device 301, generating a compressed video stream and supplying the compressed stream to the connected user via a network connection.

The video stream controller component 302 is configured using information from a service component 303. The service component 303 provides a means for all parties to register and create security credentials suitable for accessing streaming video data from the video stream controller component 302. Credentials are obtained through a service negotiation process that is implemented using the service component 303. To implement the service negotiation process, the service component 303 further provides communication means for sending requests to and receiving status updates from the camera owner 110. Using the communication means, a registered user may: obtain representative image and depth data depicting a field of view of the system 300; create and position within reference to that depiction, a virtual 3D barrier to be used in video segmentation; and receive security credentials for accessing a video service from the video stream controller. In addition to communication processes, the service component 303 provides a graphical means for constructing and manipulating the virtual 3D barrier as well as a means for communicating the barrier specification to the video stream controller component 302 of the system 300. Each of the components 301, 302 and 303 and methods will be described in detail below.

Note that the logical components 301, 302 and 303 may or may not have a separate physical realisation. In one arrangement, the video data sourcing component and video stream controller component 302 are implemented within a single stereo video camera device such as the camera device 301 as described in detail below with reference to FIGS. 10A, 10B and 4B. The service component 303 is implemented as an Internet (or "cloud") service so as to simplify installation and configuration for an end user. Implementing the video data sourcing component and video stream controller component 302 within the camera device 301 ensures that there are no readily accessible "back doors" through which unfiltered video data from the video data sourcing component, in the form of the camera device 301, can be obtained by the camera owner, providing a greater level of assurance to other parties.

However, there are situations, such as where a pre-existing network camera is to be used, where provision of the video stream controller component 302 as a separate device to the video data sourcing component would be advantageous. In such a situation, the video data sourcing component may connect separately to a camera and the network so that direct access to the camera is not possible without physical modification to the network topology.

In still another arrangement, the service component 303 may be implemented on the camera device 301. Implementing the service component 303 on the camera device 301 has certain advantages, such as independence of an external service provider that may be important to some users who are also prepared to manage the security risks associated with exposing their camera to the Internet. Use of different physical realisations may also yield other advantages. For example, separating all three components 301, 302 and 303 can provide an opportunity to employ latest generation video coding technology or additional analytic processing that may not be available in the camera 301/video data sourcing component.

Figure 10B:
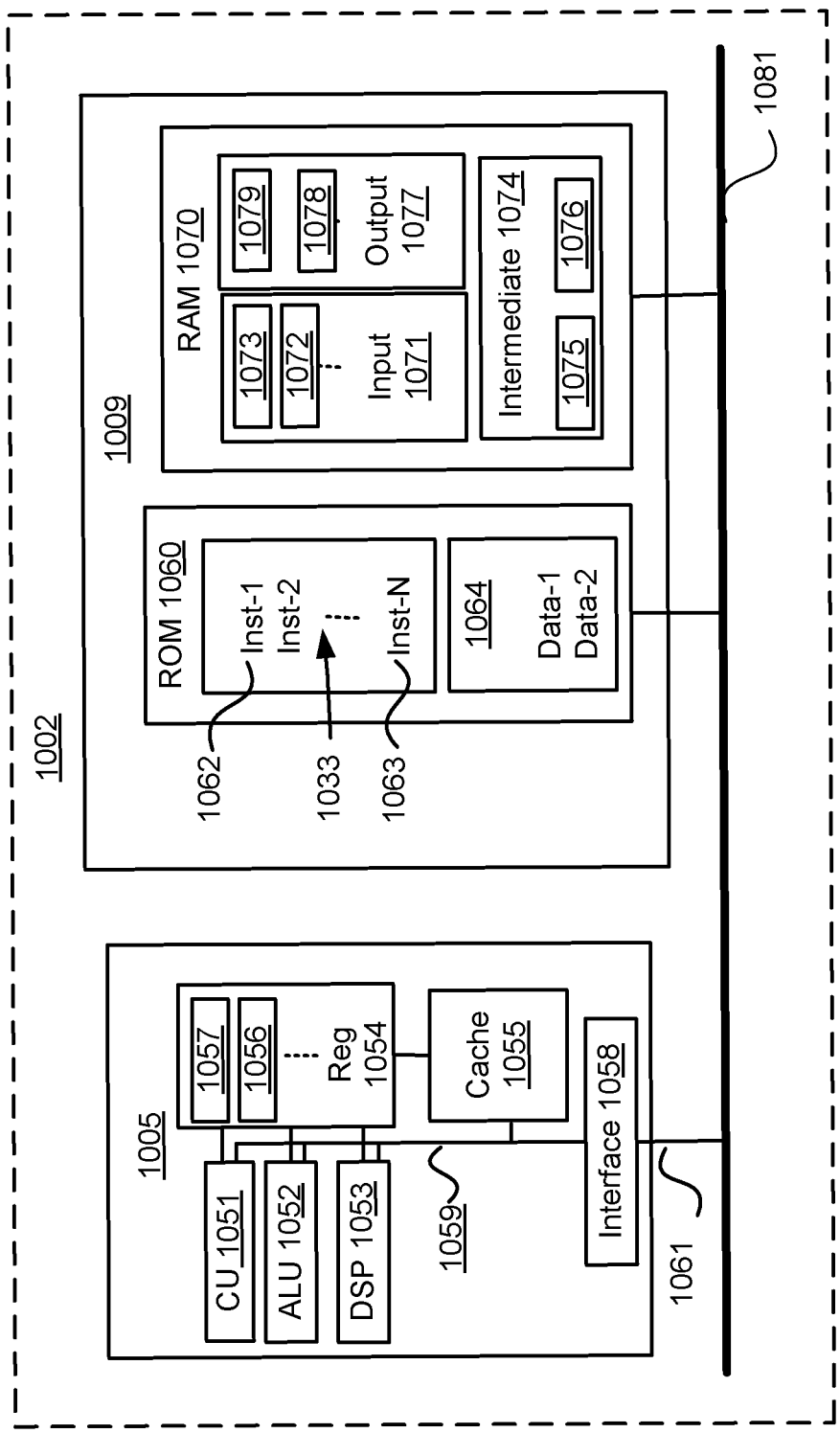

FIGS. 10A and 10B collectively form a schematic block diagram of the camera device 301 including embedded components, upon which methods to be described are desirably practiced. The device 301 is a digital camera, in which processing resources are limited. In another arrangement, the device 301 may be, for example, a mobile phone a portable media player in which processing resources are limited. Nevertheless, the methods to be described may also be performed on higher-level devices such as desktop computers, server computers, and other such devices with significantly larger processing resources.

As seen in FIG. 10A, the device 301 comprises an embedded controller 1002. Accordingly, the device 301 may be referred to as an "embedded device." In the present example, the controller 1002 has a processing unit (or processor) 1005 which is bi-directionally coupled to an internal storage module 1009. The storage module 1009 may be formed from non-volatile semiconductor read only memory (ROM) 1060 and semiconductor random access memory (RAM) 1070, as seen in FIG. 10B. The RAM 1070 may be volatile, non-volatile or a combination of volatile and non-volatile memory.

The device 301 includes a display controller 1007, which is connected to a video display 1014, such as a liquid crystal display (LCD) panel or the like. The display controller 1007 is configured for displaying graphical images on the video display 1014 in accordance with instructions received from the embedded controller 1002, to which the display controller 1007 is connected.

The device 301 also includes user input devices 1013 which are typically formed by keys, a keypad or like controls. As described above, the camera device 301 incorporates a camera and processing components required to generate RGB image frames and thus also forms an input device to the system 300.

In some implementations, the user input devices 1013 may include a touch sensitive panel physically associated with the display 1014 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 10A, the device 301 also comprises a portable memory interface 1006, which is coupled to the processor 1005 via a connection 1019. The portable memory interface 1006 allows a complementary portable memory device 1025 to be coupled to the device 301 to act as a source or destination of data or to supplement the internal storage module 1009. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 301 also has a communications interface 1008 to permit coupling of the device 301 to a computer or communications network 1020 via a connection 1021. The connection 1021 may be wired or wireless. For example, the connection 1021 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the device 301 is configured to perform some special function. The embedded controller 1002, possibly in conjunction with further special function components 1010, is provided to perform that special function. As the device 301 is a digital camera, the components 1010 may represent a lens, focus control and image sensor of the camera. The special function components 1010 is connected to the embedded controller 1002. As another example, the device 301 may be a mobile telephone handset. In this instance, the components 1010 may represent those components required for communications in a cellular telephone environment. Where the device 301 is a portable device, the special function components 1010 may represent a number of encoders and decoders of a type including Joint Photographic Experts Group (JPEG), (Moving Picture Experts Group) MPEG, MPEG-1 Audio Layer 3 (MP3), and the like.

Figure 6:
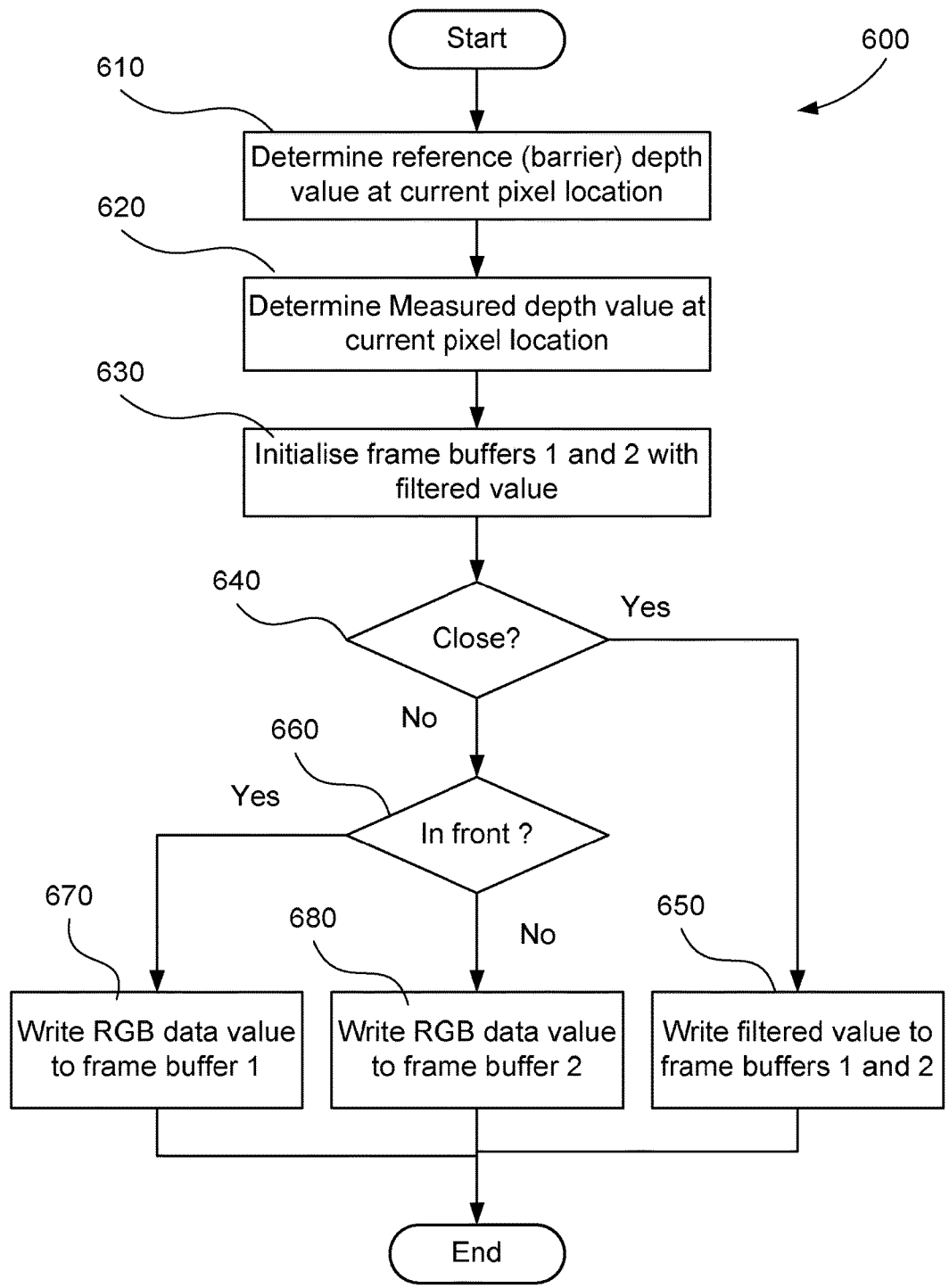
FIG. 6 is a flow diagram showing a method of generating two video streams from a received video stream.

The methods described hereinafter may be implemented using the embedded controller 1002, where the processes of FIGS. 6 and 7 may be implemented as one or more software application programs 1033 executable within the embedded controller 1002. The device 301 of FIG. 10A implements methods to be described. In particular, with reference to FIG. 10B, the steps of described methods are effected by instructions in the software 1033 that are carried out within the controller 1002. The software instructions may be formed as one or more code modules, each for performing one or more particular tasks. The software may also be divided into two separate parts, in which a first part and the corresponding code modules performs methods to be described and a second part and the corresponding code modules manage a user interface between the first part and the user.

The software 1033 of the embedded controller 1002 is typically stored in the non-volatile ROM 1060 of the internal storage module 1009. The software 1033 stored in the ROM 1060 can be updated when required from a computer readable medium. The software 1033 can be loaded into and executed by the processor 1005. In some instances, the processor 1005 may execute software instructions that are located in RAM 1070. Software instructions may be loaded into the RAM 1070 by the processor 1005 initiating a copy of one or more code modules from ROM 1060 into RAM 1070. Alternatively, the software instructions of one or more code modules may be pre-installed in a non-volatile region of RAM 1070 by a manufacturer. After one or more code modules have been located in RAM 1070, the processor 1005 may execute software instructions of the one or more code modules.

The application program 1033 is typically pre-installed and stored in the ROM 1060 by a manufacturer, prior to distribution of the device 301. However, in some instances, the application programs 1033 may be supplied to the user encoded on one or more CD-ROM (not shown) and read via the portable memory interface 1006 of FIG. 10A prior to storage in the internal storage module 1009 or in the portable memory 1025. In another alternative, the software application program 1033 may be read by the processor 1005 from the network 1020, or loaded into the controller 1002 or the portable storage medium 1025 from other computer readable media. Computer readable storage media refers to any non-transitory tangible storage medium that participates in providing instructions and/or data to the controller 1002 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1033 and the corresponding code modules mentioned above may be executed to implement one or more graphical user interfaces (GUIs) to be rendered or otherwise represented upon the display 1014 of FIG. 10A. Through manipulation of the user input device 1013 (e.g., the keypad), a user of the device 301 and the application programs 1033 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 10B illustrates in detail the embedded controller 1002 having the processor 1005 for executing the application programs 1033 and the internal storage 1009. The internal storage 1009 comprises read only memory (ROM) 1060 and random access memory (RAM) 1070. The processor 1005 is able to execute the application programs 1033 stored in one or both of the connected memories 1060 and 1070. When the device 301 is initially powered up, a system program resident in the ROM 1060 is executed. The application program 1033 permanently stored in the ROM 1060 is sometimes referred to as "firmware". Execution of the firmware by the processor 1005 may fulfil various functions, including processor management, memory management, device management, storage management and user interface.

The processor 1005 typically includes a number of functional modules including a control unit (CU) 1051, an arithmetic logic unit (ALU) 1052, a digital signal processor (DSP) 1053 and a local or internal memory comprising a set of registers 1054 which typically contain atomic data elements 1056, 1057, along with internal buffer or cache memory 1055. One or more internal buses 1059 interconnect these functional modules. The processor 1005 typically also has one or more interfaces 1058 for communicating with external devices via system bus 1081, using a connection 1061.

The application program 1033 includes a sequence of instructions 1062 through 1063 that may include conditional branch and loop instructions. The program 1033 may also include data, which is used in execution of the program 1033. This data may be stored as part of the instruction or in a separate location 1064 within the ROM 1060 or RAM 1070.

In general, the processor 1005 is given a set of instructions, which are executed therein. This set of instructions may be organised into blocks, which perform specific tasks or handle specific events that occur in the device 301. Typically, the application program 1033 waits for events and subsequently executes the block of code associated with that event. Events may be triggered in response to input from a user, via the user input devices 1013 of FIG. 10A, as detected by the processor 1005. Events may also be triggered in response to other sensors and interfaces in the device 301.

The execution of a set of the instructions may require numeric variables to be read and modified. Such numeric variables are stored in the RAM 1070. Methods to be described uses input variables 1071 that are stored in known locations 1072, 1073 in the memory 1070. The input variables 1071 are processed to produce output variables 1077 that are stored in known locations 1078, 1079 in the memory 1070. Intermediate variables 1074 may be stored in additional memory locations in locations 1075, 1076 of the memory 1070. Alternatively, some intermediate variables may only exist in the registers 1054 of the processor 1005.

The execution of a sequence of instructions is achieved in the processor 1005 by repeated application of a fetch-execute cycle. The control unit 1051 of the processor 1005 maintains a register called the program counter, which contains the address in ROM 1060 or RAM 1070 of the next instruction to be executed. At the start of the fetch execute cycle, the contents of the memory address indexed by the program counter is loaded into the control unit 1051. The instruction thus loaded controls the subsequent operation of the processor 1005, causing for example, data to be loaded from ROM memory 1060 into processor registers 1054, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in processes of methods described below is associated with one or more segments of the application program 1033, and is performed by repeated execution of a fetch-execute cycle in the processor 1005 or similar programmatic operation of other independent processor blocks in the device 301.

The video data sourcing component in the form of the camera 301 is able to generate RGB and depth information and is implemented using the stereo video camera. A housing 410 containing the camera device 301 is shown in FIG. 4B. The camera device 301 comprises two separate optical paths 411 and 412, each containing a lens system which may have controllable focus length and zoom, and which form an image on two independent image sensors. FIG. 4C shows one of the image sensors 420 comprising a rectangular array of sensor elements 421. The image sensor 420 is able to capture the incident image as an array of intensity values. Each intensity value, referred to as a raw pixel, provides a measure of the light flux within a given spectral band incident on the image sensor 420 at a specific point in the array. The spectral band measured is determined by a colour filter residing optically in front of the sensor element 421. Across the image sensor 420, different colour filters are arranged in a regular pattern in order that a set of spectral ranges are sampled uniformly. A Bayer arrangement 422 of colour filters corresponding to "red", "green" and "blue" spectral bands is used to achieve a standard colour image of the scene. The image sensors are operated according to a common clock signal so that corresponding raw pixels and frames of video data are read simultaneously from both sensors. Once raw pixels have been read from the image sensor 420, spectral samples for each band are reconstructed for each sample location by an interpolation process known as de-mosaicing. The resulting pair of images is referred to as a stereo image or stereo pair.

A stereo image contains information about a scene from two points of view. The displacement of any object in the scene in one view compared to the other is a function of the distance between the points of view and the object from the camera device 301. Because the distance between the points of view is fixed, the distance between corresponding points in the stereo pair, often referred to as stereo disparity, is indicative of scene the distance from the camera 301 to that point in the scene. By matching points across the image, depth information may be calculated across the whole field of view. The result is referred to as a depth map. Open source image processing libraries such as OpenCV including functions for recovering depth from a stereo camera may be used for matching points across the image and determining depth values. In practice, stereo methods are able to be applied where reliable pixel correspondences between left and right views can be obtained. As a result, post-processing of calculated depth values is required to in-fill any areas where reliable matches are not possible. Further, regularisation, such as edge constrained smoothing may also improve the quality of the depth map.

The configuration of the image sensors (e.g., 420) described above captures image and depth map data for a scene contained within the field of view of the system 300.

Figure 4A:
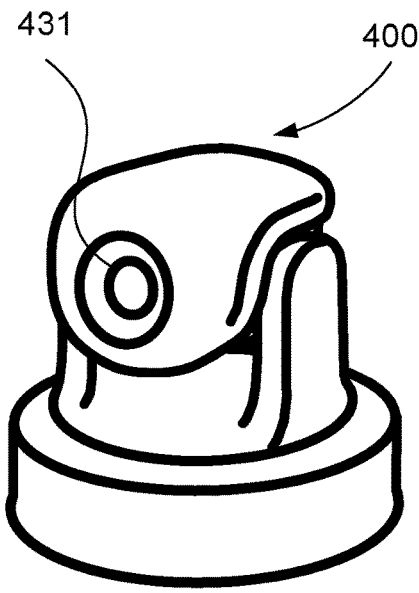
FIG. 4A shows a housing for a camera device.
Figure 4B:
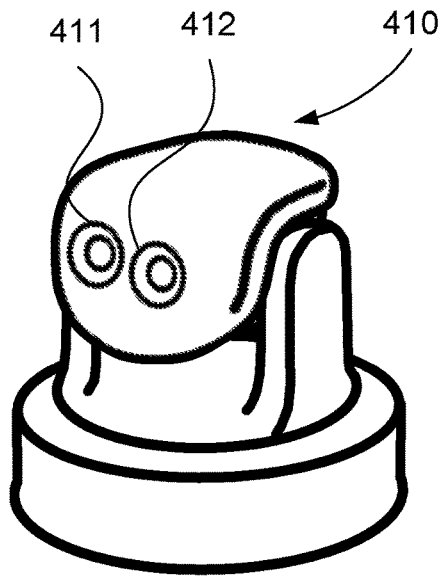
FIG. 4B shows a housing containing the camera device of FIGS. 10A and 10B.
Figure 4C:
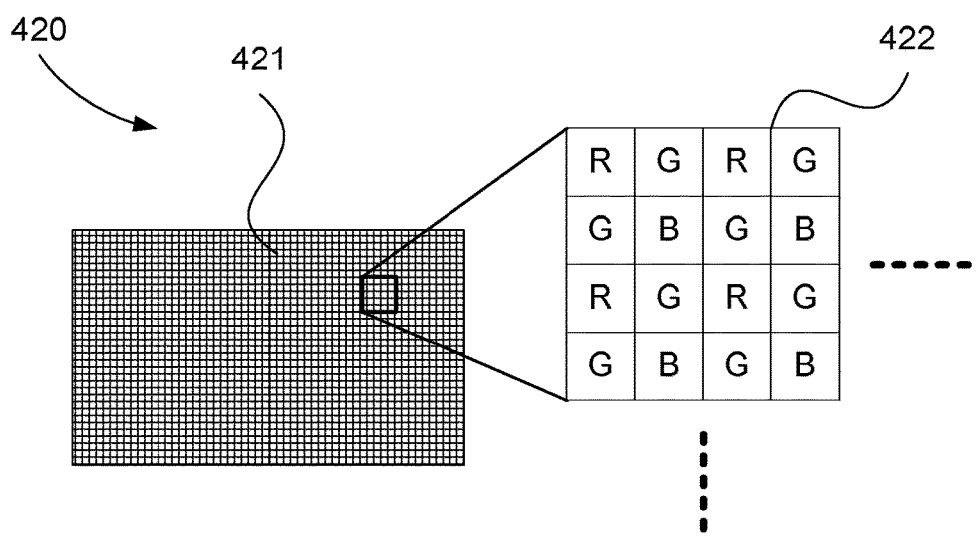
FIG. 4C shows one of the image sensors of the camera device of FIGS. 10A and 10B.

In another example arrangement, stereo image pairs may be captured on a camera device for which a housing 400, is shown in FIG. 4A. The camera device of FIG. 4A comprises a single objective lens 431 and single image sensor. The camera device of FIG. 4A may comprise an optical stereo adaptor that uses mirrors to direct light from two different viewpoints through a common lens and onto a single image capture device. Similarly, the camera of FIG. 4A can be configured to record light from different sub-apertures of a lens independently. Plenoptic cameras, such as the Lytro, provide an example of a camera that can record light from different sub-apertures and can recover depth from a plenoptic image. A number of image sensors are able to capture light from the two halves of the lens in separate sensor elements.

Figure 5A:
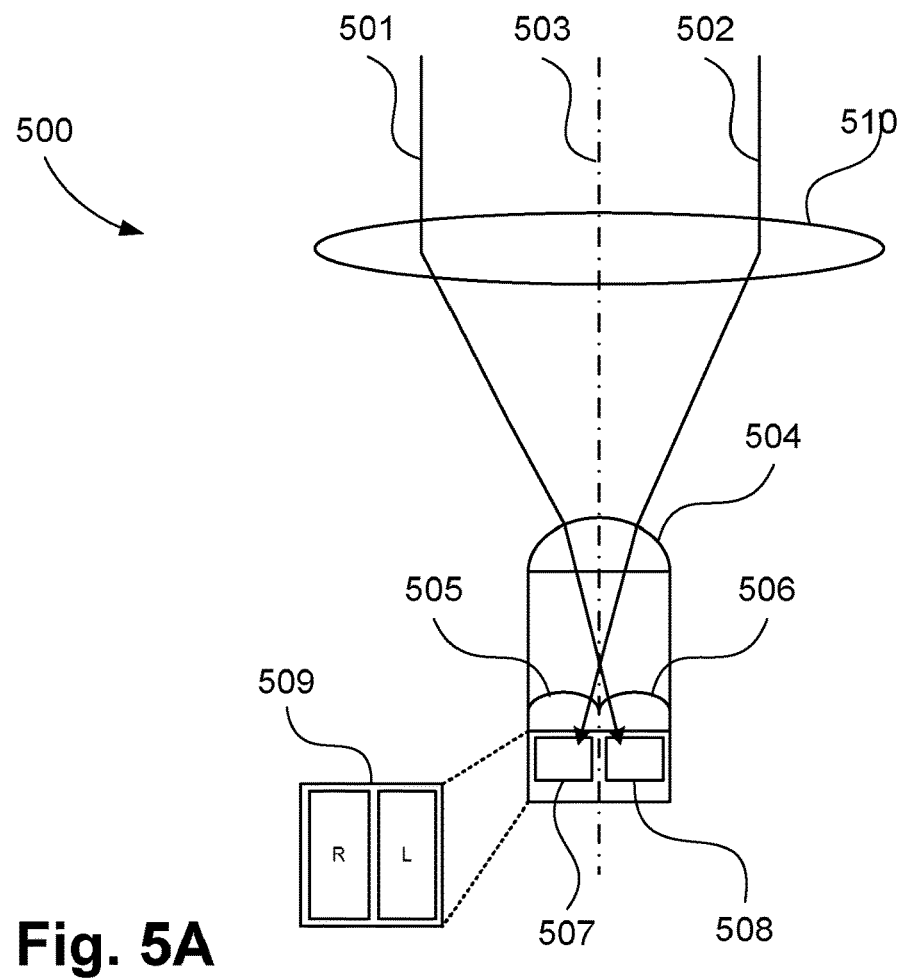
FIG. 5A shows an arrangement of image sensors.

FIG. 5A shows an arrangement 500 comprising a number of image sensors able to capture light from the two halves of a lens 510. In FIG. 5A, each pixel (PDAF pixel) 509 comprises a pair of independent photodiodes 507, 508, the outputs of which are subsequently used for driving an autofocus system and are referred to as PDAF (phase detection auto-focus) pixels. The operation of the PDAF pixels in the autofocus system is directly linked to the depth from stereo calculation described above in that the phase difference seen in the views from left and right pixel halves is a manifestation of stereo disparity. Specifically, a light ray 501 incident on a left side of the optical axis 503 of the objective lens system 510 is focused onto the microlens 504 of the pixel, and may be further directed by a sub-pixel microlens 506 onto a left sensing photodiode 508. At the same time, a light ray 502 incident on a right half of the optical axis 503 of the objective lens system 510 is focused onto the microlens 504 of the pixel, and may be further directed by a sub-pixel microlens 505 onto a right sensing photodiode 507. Thus the left and right photodiodes of the pixel capture light with a stereo disparity.

Figure 5B:
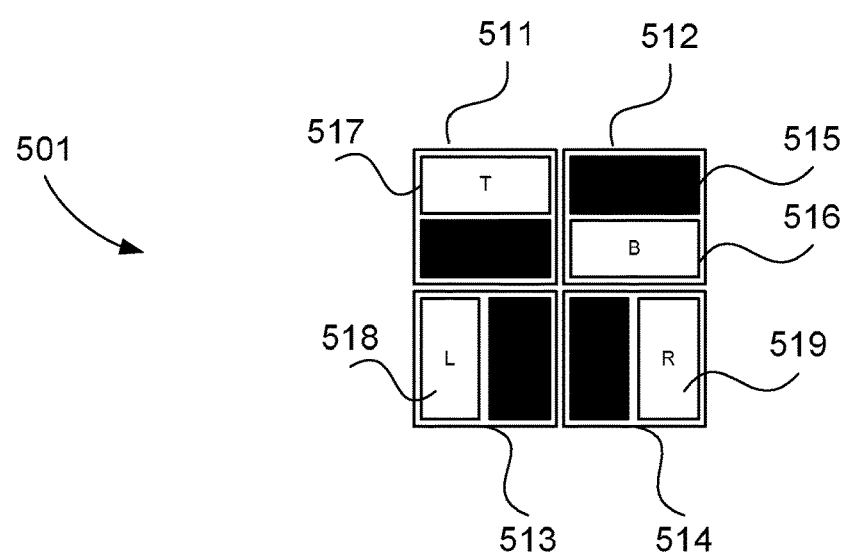
FIG. 5B shows an arrangement of pixels.

Alternative arrangements for PDAF pixels may be used in implementing the described methods. A second example arrangement 501 is shown in FIG. 5B. In the arrangement of FIG. 5B, pixels 511, 512, 513 and 514 each contains a shielded area (e.g., 515), and an exposed area (e.g., 516). The shielded area for e.g. 515 allow images to be acquired that correspond to bottom area 516, top area 517, left area 518 and right area 519 of the lens aperture.

In addition to stereo correspondence, depth may be calculated based on other changes in a measurable optical characteristic of an image pair acquired with a single lens. For example, depth has been calculated using pairs of images that differ in their focus setting. Active depth imaging methods including radar like methods, such as Lidar and Time of Flight, may also be used. Another family of methods use a projected light pattern and are collectively referred to as structured light. Structured light systems need not use visible light and may employ infrared light in such systems. It is not important how depth is measured in the described system 300, rather that depth is calculated for frames of video and used in subsequent processing of a video stream.

A method 600 of generating two video streams from a received video stream, will now be described with reference to FIG. 6. The method 600 processes RGB and depth data from the camera system 300. The method 600 generates a segmented video image (or segmented video frame) from the input RGB and depth information. The method 600 is applied to each pixel in the segmented video image. Each pixel is associated with a different region of a scene being captured by the camera system 300.

The method 600 may be implemented by the video stream controller component 302. The video stream controller component 302 may be implemented as one or more software code modules of the software application programs 1033 executable within the controller 1002 of the device 301.

The method 600 begins at a first determining step 610, where a reference (or "barrier") depth value is determined for a current pixel location under execution of the controller 1002. The reference depth value is a distance from the camera 301 to the virtual plane (3D partition). The determined reference depth value may be stored in the RAM 1070. Based on the depth information available, a measured depth value for the current pixel is then determined at determining step 620. The measured depth value may be stored in the RAM 1070.

Then at initialising step 630, a safe value for the pixel is determined and used to initialise each of output frame buffer which may be configured within RAM 1070. In the case of two parties (e.g., 110, 112), a first output buffer ("frame buffer 1") and second output frame buffer ("frame buffer 2") may be configured within the RAM 1070 and used at step 630. The safe value determined at step 630 may also be referred to as a "filtered" value. The filtered value is the value that will be used wherever content is subject to privacy screening in the output video stream. Different methods for determining the filtered value at step 630 may be used. In one arrangement, the filtered value is a predetermined grey value. The measured depth value is compared to the reference depth value at comparing step 640. In the first comparison at step 640, if the values are determined to be sufficiently close, then the measured depth value and reference depth value are considered to be equal and the pixel data is written to each of the output frame buffers at writing step 650. Closeness is determined by comparing the difference in the measured and reference depth values over a local pixel window to a predetermined threshold. The predetermined threshold may be based on known noise characteristics of the depth measurement system. If the noise characteristics of the depth measurement system vary with environmental factors such as light level or distance from the camera device 301, then the predetermined value may be replaced with a calculation which estimates the noise level given measurements or assumptions about relevant environmental factors.

If the measured depth value and reference depth value are determined to be sufficiently different at step 640, then the method 600 proceeds to decision step 660. At step 660, if the measured depth value at the current pixel is determined to be in front of the reference (screen) depth value, then the pixel data representing a region of the scene is written to one of the frame buffers (frame buffer 1) at 670. The value written at step 670 overwrites the value previously initialised at step 630. The pixel data written to the frame buffer 1 at step 670 represents a region of the scene which is assigned to a video stream stored in the frame buffer 1.

Otherwise, if the measured depth value at the current pixel is determined to be behind the reference (screen) depth value, then the pixel data is written to the other of the frame buffers (frame buffer 2) at 680. The pixel data written to the frame buffer 2 at step 680 represents a region of the scene which is assigned to a video stream stored in the frame buffer 2. Again, the value written at step 680 overwrites the value previously initialised at step 630.

Through the method 600, in one arrangement, two output video streams are generated where each of the video streams represents an image. As described above, steps 670 and 680 are used for assigning regions of the scene captured by the camera system 300 to the output video streams stored in the frame buffers. In a first one of the images (e.g., stored in frame buffer 1), all areas near to or in front of a reference depth value are rendered using the pixel values measured from the camera device 301 while all other pixels of the first image are greyed out. Similarly, in the second one of the images (e.g., stored in frame buffer 2), all areas near or more distant compared to the same reference depth value are rendered using the pixel values measured from the camera device 301 while all other pixels of the second image are greyed out. For example, as seen in FIGS. 2A and 2B, images 201 and 211 are examples of the first image generated at step 670. Further, images 202 and 212 are examples of the second image generated at step 680.

Figure 7:
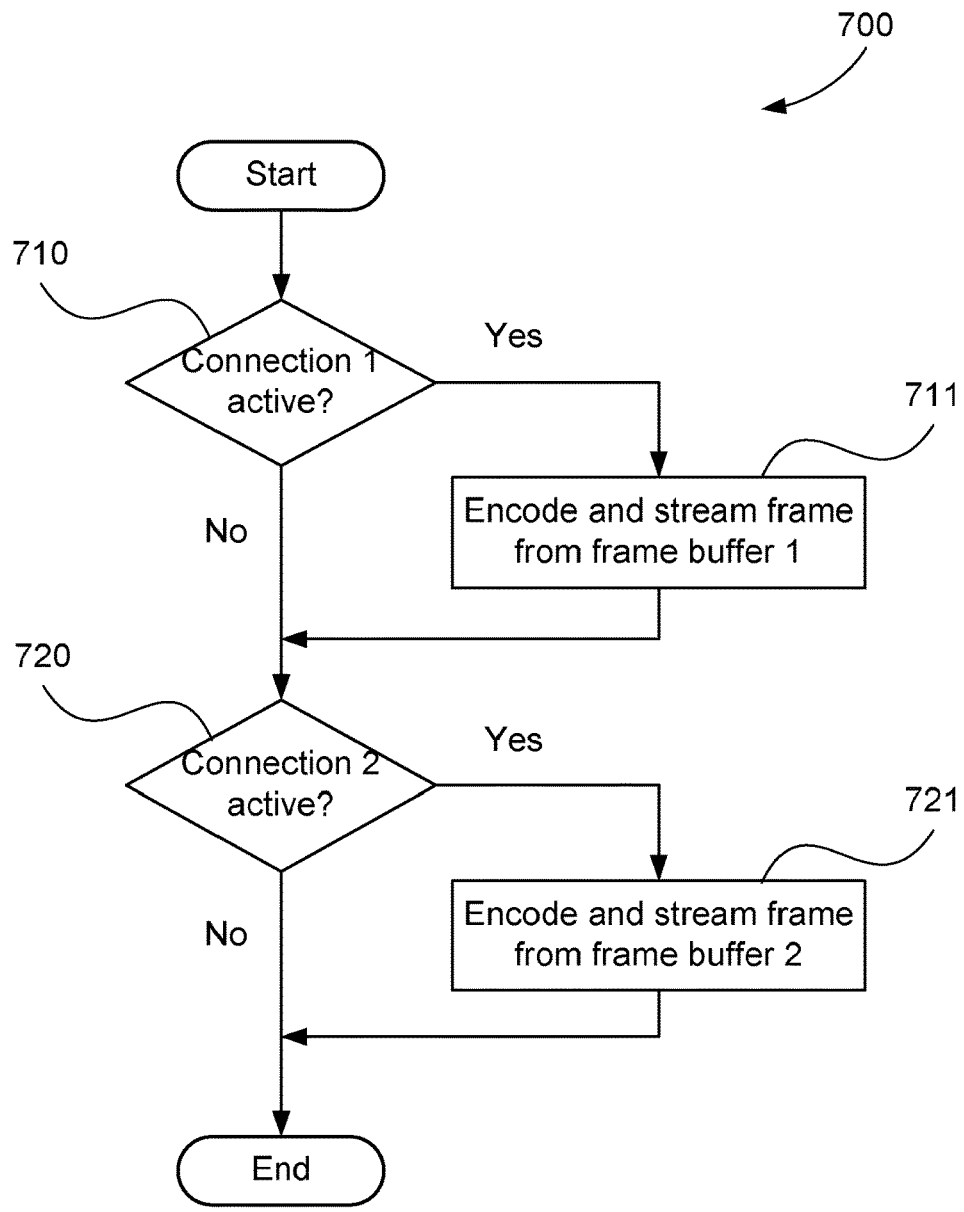
FIG. 7 is a flow diagram showing a method of encoding video streams generated in accordance with the method of FIG. 6.

Once the images (or frames) have been generated, the images may be encoded and transmitted to the relevant party in a method 700 shown in FIG. 7. The method 700 involves testing for an open connection for the relevant party and, when such a connection exists, pushing the image data to a video encoder. The resulting output of the video data is written to a streaming data connection implemented for example using the network 1020.

The method 700 may be implemented by the video stream controller component 302. The video stream controller component 302 may be implemented as one or more software code modules of the software application programs 1033 executable within the controller 1002 of the device 301.

In the method 700, a test is performed at testing step 710 to determine if streaming data "connection 1" corresponding to a first party (e.g., 110) is active. If the test performed at step 710 returns positive, then the image in frame buffer 1 is encoded and written to a corresponding streaming interface at encoding step 711.

Subsequently, a test is performed at testing step 720 to determine if streaming data "connection 2" corresponding to a second party (e.g., 112) is active. If the test performed at step 720 returns positive then the image in frame buffer 2 is encoded and written to a corresponding streaming interface at encoding step 721. Each party (e.g., 110, 112) connects to the system 300 using an independent streaming connection so that it is not possible for the first party to see the video stream belonging to the second party and vice versa. Greater than two parties (e.g., 110, 112) can be supported by the system 300. Where greater than two parties are supported, tests and encoding steps may not need to be executed sequentially if parallel process is possible on a platform on which the system 300 is implemented.

In one arrangement, screened areas appear greyed out in the output video streams representing the output images. Other variations are possible and may be used in certain use cases. For example, instead of using a constant grey value, a filtered version of the output video stream may be used. In one arrangement, a pixel from an agreed snapshot of a scene, a blurred or pixelised version of the output image, or an average grey value at a pixel for the last day may be used. Where the average grey value at a pixel for the last day is used, a very long term average may be used to ensure that there is unlikely to be any regular activity exposed. A very long term average also ensures that the view remains up to date so that the segmented video streams are able to be seen in context and are easier to understand to a viewer. The use of a grey value in place of a colour value provides a visual cue to the viewer that allows the viewer to understand what areas are masked and unmasked. Other cues may also be used to achieve the same effect for a colour pixel. For example, a checkerboard or similar patterned grid may be used to overlay colour pixel data. Blur and pixelisation may also be used on colour pixel data.

Figure 8:
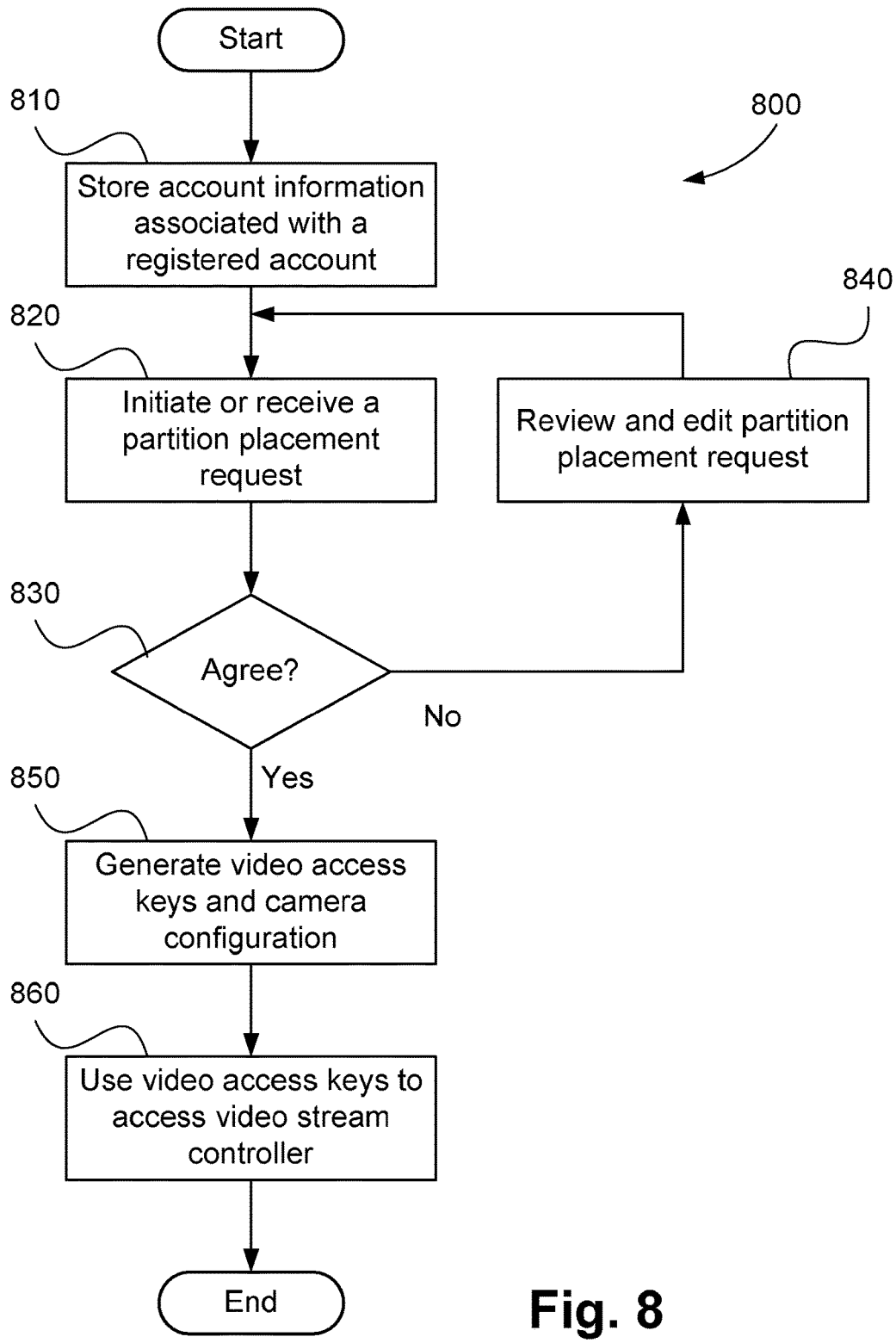
FIG. 8 is a flow diagram showing a method of registering with a service component of the system of FIG. 3.

A method 800 of registering with a service component 303 of the system 300 will be described with reference to FIG. 8. The method 300 will be described where the service component 303 is implemented on the camera device 301, where one or more steps of the method 300 are implemented as one or more software code modules of the software application programs 1033 executable within the controller 1002 of the device 301. However, as described above, the service component 303 may be implemented as an Internet service.

The method 800 enables a party (e.g., 112) to register with the service component 303 of FIG. 3. The method 800 also enables configuration and eventual retrieval of privacy screened video streams.

The method 800 begins at step 810, where each of the parties (e.g., 110, 112) create an account with the system 300 in a first account creating step 810. Step 810 may involve any desired level of identity verification, depending on required sensitivity of a particular arrangement. In an agreement between neighbours in a suburban setting, for example, identity verification may not be required. In a more security conscious arrangement, some form of identification linked to an address may be required, such as a credit card. Identity validation may also be achieved by using a third party login service such as the third party login services offered by Internet service providers or social media platforms.

Account information for a registering party (e.g., 112) may be received by the (service component 303 of the) camera 301 at step 810 and be stored in the storage module 1009 at step 810. The account information, including any identification information, may be provided to the service component 303 of the camera device 301 by the registering party via a client device (e.g., a computer or mobile device) connected to the network 1020. Other methods, including the use of trusted digital signatures, may also be used at step 810. The account creation process executed at step 810 may also establish whether the registering party is a camera owner.

A camera owner may be required at step 810 to enter the details of at least one camera (e.g., the camera device 301). A communication link may be established with the camera device 301, via the network 1020, through the video stream controller component 302 where a representative image from the camera 301 may be obtained from the ROM 1060. Other information such as a geospatial location of the camera 301 are also obtained either manually or by information request to the camera 301 or network 1020 where such capability exists. The details of the camera 301, along with a representative view from the camera 301 are subsequently made available to registered parties (e.g., new and existing) who are in the same geospatial area as the camera 301. A non-owner (e.g., 112) registering with the system 300 may also have to provide geospatial location data. The geospatial location data may be used by the system 300 to make a list of registered cameras in an area available to the parties along with representative images from the listed cameras. As such, a non-owner user can identify camera(s) on which the non-owner user may wish to place privacy restrictions.

Having registered with the service, at receiving step 820, a partition placement request is received by the service component 303 of the camera device 301 under execution of the controller 1002. The partition placement request may be made by any non-owner of the camera device 301. The non-owner may use the client device (e.g., a computer or mobile device) connected to the network 1020 to select a nearby camera and initiate the partition placement request. The non-owner may mark up a representative image from a scene captured by the camera device 301 to include the location of a virtual 3D partition. The partition information is subsequently sent to the relevant owner of the camera 301 in a message, such as an SMS, email, or direct message. The message may be sent to a special purpose application or program running on the computer or mobile device being used by the owner.

At decision step 830, if the partition request is agreed to by the owner (e.g., 110) of the camera device 301, then the method 800 proceeds to step 850. The agreement by the owner (e.g., 110) may be indicated to the service component 303 of the camera device 301 via the network 1020. If the partition request is not agreed to by the owner of the camera device 301, then the method 800 proceeds to editing step 840. At step 840, the service component 303 of the camera device 301 receives information to edit the partition placement request. Again, the editing information may be provided by the owner (i.e., 110) of the camera device 301 via the network 1020. If an edit is made, then the relevant other party (e.g., 112) may be provided with information about the edits in a message sent from the service component 303 of the camera device 301 in the form of a partition placement request at step 820. As such, both parties (e.g., 110, 112) are able to review and modify the partition placement until agreement is reached.

If agreement of the partition placement is identified at step 830, then the method 800 proceeds to generating step 850. At step 850, the video stream controller component 302 is configured, or in other words, the camera is configured, using the partition information corresponding to the partition replacement request received at step 820. The registered information from each of the users (e.g., 110, 112) may be used at step 850 to establish an access credential (video access keys) that may be used to access the filtered video stream from the video stream controller component 302. There are a number of methods that may be used to implement step 850, depending on the security versus simplicity trade-off that is acceptable to the system 300. In one arrangement, each party (e.g., 110, 112) may be provided with a unique and undiscoverable secure access token (e.g., a secure URL) that may be used to access the relevant video stream. In a more secure arrangement, an access URL may be provided where the access URL is secured with the password of a user for the service. The video stream controller component 302 is also configured so that the unfiltered video stream from the video data sourcing component 301 is password protected so that no inadvertent (or deliberate) breaches of the privacy screen are possible.

Once the video stream controller component 302 is configured, the login credentials are communicated to the relevant parties (e.g., 110, 112) who are subsequently able to use the credentials (video access keys) at step 860 to access the screened video that is relevant to party.

If for any reason an unfiltered video stream is required, then the unfiltered video stream may be generated by recombination of the component video streams generated in the method 600. For a program or application software to perform the generation of the unfiltered video stream, the program or application software needs access to the filtered streams for each of the registered parties. Alternatively, recorded footage from each party may be combined using digital editing.

Should the owner of the camera 301 perform a reset on the video stream controller component 302 then the configuration data may be reloaded from the service component 303 upon restart. The service component 303 is configured for logging and messaging all parties when the video stream controller component 302 is reset and reconfigured. As such, parties can know if a reset has not been followed by a reconfigure, which could indicate that the virtual privacy screen is no longer in effect.

The partition is constructed and edited by the parties at step 840 using software with reference to data captured by the camera device 301. In an alternate implementation of the system 300, all of the logical components including the camera 301, the video stream controller component 302 and the service component 303 are implemented within a camera device 301. That is, the modules comprising the service component 303 and the video stream controller component 302 are implemented using software 1033 in the form of one or more code modules stored in the ROM 1060 and executed by the processor 1005 of the embedded controller 1002.

Figure 9:
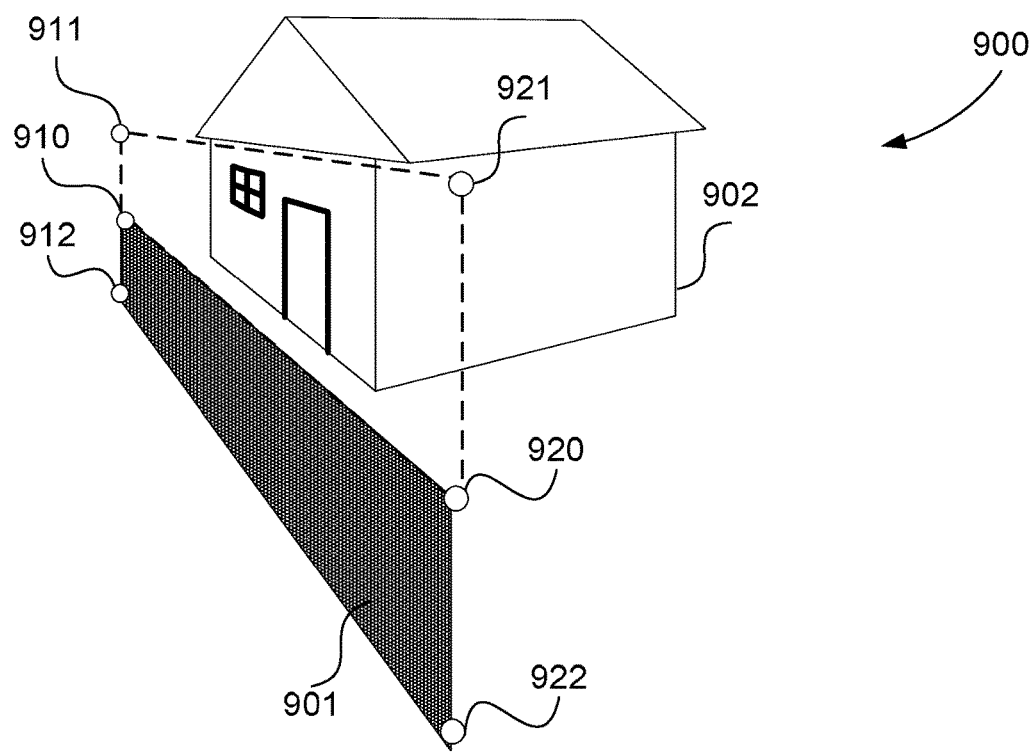
FIG. 9 shows part of a user interface that is employed by users to create the definition of a virtual three dimensional (3D) privacy screen.

The method 600 will now be described with reference to FIG. 9. The interface for entering the partition details may be provided with the representative image 900 from the relevant camera device (e.g., 301). The representative image may include depth information as calculated by the camera system 300. The user then defines a partition as a set of rectangular facets where each facet is defined by two lines corresponding to opposite sides of the facet. In FIG. 9, points 910, 911 and 912 correspond to a first line and points 920, 921 and 922 correspond to a second line, collectively describing the rectangular facet 911, 912, 922, and 921. The redundant points are required to support the 3D definition of the partition as will now be described.

To define 3D points, a user needs to be able to select a pixel for which the depth information at that pixel corresponds to the depth of the required partition. Examples of such 3D points include points 910, 912, 920 and 922 since the points 910, 912, 920 and 922 can be defined with reference to a physical object within the scene. However, points 911 and 921 are positioned directly above the boundary fence 901 in mid-air. As a result, depth information corresponding to point 921, for example, corresponds to the depth of the side wall of the neighbouring house 902. To allow a correct definition of a virtual 3D partition where end points such as point 921 reside "in the air", redundancy in the line definition may be used. For example, the depth at point 920 and 922 are used to define a function in (x,y,d) space, where x and y are the 2D spatial image coordinates and d is the depth coordinate. Thus, given camera calibration parameters the depth position of the point 921 may be extrapolated. Once the corner points have been determined, the depth value for any point contained within the bounded area may be interpolated. The virtual 3D partition (virtual plane) as described above are thus made up of the points 911, 910, 920 and 921.

Three points may be used to fix any location in 3D image space. Of these three points, an anchor point defined by the 2D spatial location of the point in the image plane and the other two points, regarded as control points, are collinear in (x,y,d) with the anchor point. A virtual 3D partition may be constructed by defining a set of 3D image space locations and grouping the 3D partition into triangular or rectangular facets. In other words, an anchor point can be any point for which the depth (reference depth value) to the virtual 3D partition is equal to (or close as described above) the measured depth value. As an example, in FIG. 9, point 920 is an anchor point, as point 920 is anchored to a physical object within the scene (the side wall of the neighbouring house 902). Hence the reference depth value at point 920 is equal to the measured depth value. Point 922 is then a control point which allows depth extrapolation since depth in the same plane as the virtual screen can be measured at point 922. Point 921 is another control point since point 921 defines an end-point to an extrapolated line of depth and a corner of the virtual plane. In an alternate arrangement, point 922 is an anchor point and points 920 and 921 are the control points.

The arrangements described are applicable to the computer and data processing industries and particularly for image processing.

INDUSTRIAL APPLICABILITY

The foregoing describes only some embodiments of the present disclosure, and modifications and/or changes can be made thereto without departing from the scope and spirit of the invention, the embodiments being illustrative and not restrictive.

The invention claimed is:

1. A method of generating two video streams from a received video stream, the method comprising:
dividing a scene captured by the received video stream into a first region and a second region by placing a virtual plane in the scene such that the virtual plane defines and separates the first region and the second region;
assigning the regions of the scene represented in the received video stream to at least one of two output video streams, the first region being assigned to at least a first output video stream and the second region to at least a second output video stream according to the virtual plane; and
encoding pixel data assigned to each output video stream to generate the two video streams.

2. The method according to claim 1, further comprising assigning the first output video stream to a first user and the second output video stream to a second user.

3. The method according to claim 1, further comprising providing a first secure access token to a first user for accessing the first output video stream and a second secure access token to a second user for accessing the second output video stream.

4. The method according to claim 1, further comprising capturing the first output video stream using a first set of capture parameters and the second output video stream using a second set of capture parameters, the first and second set of capture parameters being different.

5. The method according to claim 1, wherein the virtual plane is represented as a two dimensional (2D) shape and has an associated three dimensional 3D location determined by reference to depth information determined by analysis of the scene, and the virtual plane encodes screen depth for each image pixel location within a screened area.

6. The method according to claim 1, wherein a position of the virtual plane with respect to the scene is agreed by at least two parties, at least one of the parties being a camera owner.

7. The method according to claim 1, wherein one or more of: (i) each point in the first region is characterised as being on a first side of the virtual plane and each point in a second region is characterised as being on a second side of the virtual plane; and (ii) each point in the first region is assigned to the first output video stream, and each point in the second region is assigned to the second output video stream.

8. The method according to claim 1, wherein each point within a predetermined distance of the virtual plane is assigned to both the first output video stream and the second output video stream.

9. The method according to claim 1, wherein a point assigned to the first video output stream is replaced with alternative content in the second output video stream.

10. An apparatus for generating two video streams from a received video stream, the apparatus comprising:
    means for dividing a scene captured by the received video stream into a first region and a second region by placing a virtual plane in the scene such that the virtual plane defines and separates the first region and the second region;
    means for assigning the regions of the scene represented in the received video stream to at least one of two output video streams, the first region being assigned to at least a first output video stream and the second region to at least a second output video stream according to the virtual plane; and
    means for encoding pixel data assigned to each output video stream to generate the two video streams.

11. A system for generating two video streams from a received video stream, the system comprising:
    a memory for storing data and a computer program;
    a processor coupled to the memory for executing the program, the processor operating to:
    divide a scene captured by the received video stream into a first region and a second region by placing a virtual plane in the scene such that the virtual plane defines and separates the first region and the second region;
    assign the regions of the scene represented in the received video stream to at least one of two output video streams, the first region being assigned to at least a first output video stream and the second region to at least a second output video stream according to the virtual plane; and
    encode pixel data assigned to each output video stream to generate the two video streams.

12. A non-transitory computer readable medium storing at least one computer program that causes a processor to execute a method for generating two video streams from a received video stream, the method comprising:
    dividing a scene captured by the received video stream into a first region and a second region by placing a virtual plane in the scene such that the virtual plane defines and separates the first region and the second region;
    assigning the regions of the scene represented in the received video stream to at least one of two output video streams, the first region being assigned to at least a first output video stream and the second region to at least a second output video stream according to the virtual plane; and
    encoding pixel data assigned to each output video stream to generate the two video streams.

13. The apparatus of claim 10, wherein the first and second regions are assigned according to the virtual plane such that the first region and the second region have different output video streams based on the virtual plane division.

14. The system of claim 11, wherein the first and second regions are assigned according to the virtual plane such that the first region and the second region have different output video streams based on the virtual plane division.

15. The non-transitory computer readable medium of claim 12, wherein the first and second regions are assigned according to the virtual plane such that the first region and the second region have different output video streams based on the virtual plane division.

16. The method of claim 1, wherein one or more of the following:
    (i) the first video stream and the second video stream operate to provide both a surveillance option and a privacy confirmation option for the first region and the second region, respectively;
    (ii) the method further comprises displaying, for the first video stream, details or objects residing only in the first region, and displaying, for the second video stream, information or objects residing only in the second region; and
    (iii) the method further comprises removing information or objects residing in the second region from a video feed or display of the first video stream such that the video feed or the display of the first video stream only displays information or objects residing in the first region, and removing information or objects residing in the first region from a video feed or display of the second video stream such that the video feed or the display of the second video stream only displays information or objects residing in the second region.

17. The apparatus of claim 10, wherein one or more of the following:
    (i) the first video stream and the second video stream operate to provide both a surveillance option and a privacy confirmation option for the first region and the second region, respectively;
    (ii) the apparatus includes means for displaying, for the first video stream, details or objects residing only in the first region, and for displaying, for the second video stream, information or objects residing only in the second region; and
    (iii) the apparatus includes means for removing information or objects residing in the second region from a video feed or display of the first video stream such that the video feed or the display of the first video stream only displays information or objects residing in the first region, and for removing information or objects residing in the first region from a video feed or display of the second video stream such that the video feed or the display of the second video stream only displays information or objects residing in the second region.

18. The system of claim 11, wherein one or more of the following:
    (i) the first video stream and the second video stream operate to provide both a surveillance option and a privacy confirmation option for the first region and the second region, respectively;

(ii) the processor further operates to display, for the first video stream, details or objects residing only in the first region, and display, for the second video stream, information or objects residing only in the second region; and (iii) the processor further operates to remove information or objects residing in the second region from a video feed or display of the first video stream such that the video feed or the display of the first video stream only displays information or objects residing in the first region, and to remove information or objects residing in the first region from a video feed or display of the second video stream such that the video feed or the display of the second video stream only displays information or objects residing in the second region.

19. The non-transitory computer readable medium of claim 12, wherein one or more of the following:

(i) the first video stream and the second video stream operate to provide both a surveillance option and a privacy confirmation option for the first region and the second region, respectively;

(ii) the method further comprises displaying, for the first video stream, details or objects residing only in the first region, and displaying, for the second video stream, information or objects residing only in the second region; and (iii) the method further comprises removing information or objects residing in the second region from a video feed or display of the first video stream such that the video feed or the display of the first video stream only displays information or objects residing in the first region, and removing information or objects residing in the first region from a video feed or display of the second video stream such that the video feed or the display of the second video stream only displays information or objects residing in the second region.

20. The method of claim 2, further comprising one or more of:

(i) recovering or generating a full video stream by recombining the first output video stream and the second output video stream in a case where the first user and the second user authorize the recovering or generating of the full video stream;

(ii) displaying the recovered or generated full video stream; and (iii) displaying the recovered or generated full video stream such that the full video stream displays an event that occurred across the first region and the second region.

* * * * *